(12) United States Patent
Autry et al.

(10) Patent No.: US 12,132,839 B2
(45) Date of Patent: Oct. 29, 2024

(54) DECENTRALISED AUTHENTICATION

(71) Applicant: Iothic Ltd, Essex (GB)

(72) Inventors: Christopher Patrick Autry, Essex (GB); Andrew William Roscoe, Essex (GB); Mykhailo Magal, Essex (GB)

(73) Assignee: Iothic Ltd, Essex (GB)

(*) Notice: Subject to any disclaimer, the term of this patent is extended or adjusted under 35 U.S.C. 154(b) by 590 days.

(21) Appl. No.: 17/251,916

(22) PCT Filed: May 31, 2019

(86) PCT No.: PCT/GB2019/051524
§ 371 (c)(1),
(2) Date: Dec. 14, 2020

(87) PCT Pub. No.: WO2019/239108
PCT Pub. Date: Dec. 19, 2019

(65) Prior Publication Data
US 2021/0167963 A1    Jun. 3, 2021

(30) Foreign Application Priority Data

Jun. 15, 2018 (GB) .................................... 1809887

(51) Int. Cl.
*H04L 9/32* (2006.01)
*H04L 9/40* (2022.01)
*H04L 9/00* (2022.01)

(52) U.S. Cl.
CPC ............ *H04L 9/3228* (2013.01); *H04L 9/321* (2013.01); *H04L 9/3234* (2013.01);
(Continued)

(58) Field of Classification Search
CPC ............. H04L 63/0884; H04L 63/0869; H04L 9/3228; H04L 9/321; H04L 2209/76
See application file for complete search history.

(56) References Cited

U.S. PATENT DOCUMENTS

| 7,234,058 B1 | 6/2007 | Baugher |
| 7,370,351 B1* | 5/2008 | Ramachandran ....... H04L 63/08 726/8 |

(Continued)

FOREIGN PATENT DOCUMENTS

| EP | 2034659 | 3/2009 |
| JP | 11163850 A | 6/1999 |

(Continued)

OTHER PUBLICATIONS

Espacenet machine translation of WO2018/004114A2, 30 pages.*
(Continued)

*Primary Examiner* — Zachary A. Davis
(74) *Attorney, Agent, or Firm* — Jordan IP Law, LLC

(57) ABSTRACT

First and second devices store respective device data and private keys. The first-device data is additionally stored by the second device and by a proxy; and the second-device data is additionally stored by the first device and by the proxy. In a commitment phase, each of the first and second devices uses its respective device data, private key and a random nonce to generate a respective one-time first-device or second-device commitment value, which it sends to the proxy. In a checking phase, the devices communicate secret-key information to the proxy, which verifies the received one-time commitment values. In a digest phase, the proxy calculates a one-time digest, which it sends to the second device. The second device then verifies the received one-time digest to authenticate the first device.

12 Claims, 10 Drawing Sheets

(52) U.S. Cl.
CPC ........ *H04L 9/3239* (2013.01); *H04L 63/0869* (2013.01); *H04L 63/0884* (2013.01); *H04L 9/006* (2013.01); *H04L 2209/76* (2013.01)

(56) References Cited

U.S. PATENT DOCUMENTS

| | | | | |
|---|---|---|---|---|
| 8,898,453 B2* | 11/2014 | Preiss | ................ | H04L 63/0807 726/19 |
| 10,169,587 B1* | 1/2019 | Nix | .................... | H04W 12/041 |
| 2006/0282662 A1 | 12/2006 | Whitcomb | | |
| 2007/0255952 A1 | 11/2007 | Zhou | | |
| 2008/0137856 A1 | 6/2008 | Ja Beom | | |
| 2008/0270794 A1 | 10/2008 | Falk et al. | | |
| 2009/0239500 A1 | 9/2009 | Aripirala | | |
| 2010/0115277 A1* | 5/2010 | Roscoe | ................ | H04L 9/3215 713/170 |
| 2010/0220856 A1 | 9/2010 | Kruys | | |
| 2012/0063597 A1 | 3/2012 | Tropp | | |

FOREIGN PATENT DOCUMENTS

| | | |
|---|---|---|
| JP | 2005038411 | 2/2005 |
| JP | 2006333095 | 12/2006 |
| JP | 2009515448 A | 4/2009 |
| KR | 20180003196 | 1/2018 |
| WO | 2015001600 | 1/2015 |
| WO | 2018/004114 | 1/2018 |
| WO | WO-2018004114 A2 * | 1/2018 ............. H04L 29/06 |
| WO | 2018/158564 | 9/2018 |

OTHER PUBLICATIONS

Clarivate machine translation of WO2018/004114A2, 25 pages.*
*HCBK: security technology for the mobile generation.* (2010). University of Oxford. https://www.cs.ox.ac.uk/files/3079/HCBKBrochure.pdf.
Nguyen, L. H., & Roscoe, A. W. (2010). Authentication protocols based on low-bandwidth unspoofable channels: A comparative survey. *Journal of Computer Security,* 19(1), 139-201. https://doi.org/10.3233/jcs-2010-0403.
Roscoe, A. W. (2017). Detecting Failed Attacks on Human-Interactive Security Protocols. *Security Protocols XXIV,* 181-197. https://doi.org/10.1007/978-3-319-62033-6_21.
Xu et al., "Secure Transfer Protocol Between App and Device of Internet of Things," Lecture Notes in Computer Science, vol. 10658. Springer, pp. 25-34. 2017.

* cited by examiner

Handshaking after Deployment
Part I

Handshaking after Deployment
Part II

DECENTRALISED AUTHENTICATION

CROSS-REFERENCE TO RELATED APPLICATIONS

This application represents the U.S. National Phase of International Application number PCT/GB2019/051524 entitled "Decentralized Authentication" filed 31 May 2019, which claims benefit from Great Britain Application number 1809887.1 filed 15 Jun. 2018, all of which are incorporated herein by reference.

BACKGROUND OF THE INVENTION

This invention relates to methods and systems for authenticating devices.

The process of authentication is a central concept in cryptographic systems. Authentication establishes trust between two parties that wish to exchange information. Authentication can determine if a party is who or what it claims to be. Authentication is distinct from authorisation; authorisation determines what a party is allowed to do, such as what other parties it may or may not communicate with.

Authentication is conventionally performed using a public key infrastructure (PKI) in which centralized, trusted third parties (TTPs), referred to as certification authorities (CAs), carefully check a party's identity and then certify the party's public key (of an asymmetric key pair). When a second party sees this certificate, the second party then knows how to generate a message that only the first party can decrypt, or the second party can verify a signature that proves that the first party was really the author of a cryptographically signed document.

However, PKI is not well suited to all situations. PKI is designed for a centralized client-server model in which all parties that wish to authenticate must communicate via some centralized network, commonly the public Internet, in order to complete the transaction. The parties must rely on TTPs to hold certificates which can be costly. The complexity of PKI makes it poorly suited to the Internet of Things (IoT), in which it is desirable to provide authentication for billions of nodes, many of which are mobile and may lack any commonly understood sense of identity, at least from the point of view of the world at large. Even if the nodes do have a meaningful identity (e.g., by virtue of their ownership, or their physical location), the cost of creating and maintaining an effective PKI at this scale will be very great. The bigger and more structured a PKI is, the more layers of CAs are typically required. This can place unacceptable computer power and electrical power demands on devices, which may be simple battery-powered sensors, due to the complex mathematical calculations that PKI authentication requires. Moreover, in complex IoT systems many assets typically need to communicate with many other assets in real-time in short, one-off bursts.

There have been attempts to provide authentication for large-scale IoT networks by using PKI authentication at the gateway level. However, relying on gateway authentication leaves sensors and sensor hubs vulnerable to various attacks, such as brute force attacks, man-in-the middle attacks, and post-quantum exposure. If a gateway is exposed, so too are all the components that rely on the gateway for connectivity, routing and functionality.

The present invention seeks to provide an alternative approach to authentication, which overcomes at least some of these shortcomings that are present in conventional centralized PKI authentication methods.

SUMMARY OF THE INVENTION

From a first aspect, the invention provides a method for authenticating a first device to a second device using a proxy, wherein:
  the first device stores first-device data and a first-device private key;
  the second device stores second-device data and a second-device private key;
  the first-device data is additionally stored by the second device and by the proxy; and
  the second-device data is additionally stored by the first device and by the proxy,
the method comprising, in a commitment phase:
  the first device using the first-device data and first-device secret-key information to generate a one-time first-device commitment value, the first-device secret-key information comprising, or being derived from, the first-device private key and a first random nonce;
  the first device sending the one-time first-device commitment value to the proxy;
  the second device using the second-device data and second-device secret-key information to generate a one-time second-device commitment value, the second-device secret-key information comprising, or being derived from, the second-device private key and a second random nonce;
  the second device sending the one-time second-device commitment value to the proxy, the method further comprising, in a checking phase performed after the commitment phase:
the first device communicating the first-device secret-key information to the proxy;
  the second device communicating the second-device secret-key information to the proxy;
  the proxy using the first-device data stored by the proxy, and the first-device secret-key information received from the first device, to verify the one-time first-device commitment value received from the first device; and
  the proxy using the second-device data stored by the proxy, and the second-device secret-key information received from the second device, to verify the one-time second-device commitment value received from the second device;
the method further comprising, in a digest phase, performed after a successful verification of the one-time first-device commitment value and of the one-time second-device commitment value in the commitment phase:
  the proxy calculating a one-time digest from i) the first-device data stored by the proxy, ii) the second-device data stored by the proxy, iii) the first-device secret-key information received from the first device, and iv) the second-device secret-key information received from the second device;
  the proxy sending the one-time digest to the second device; and
  the second device authenticating the first device by using at least i) the first-device data stored by the second device, ii) the second-device data stored by the second device, iii) the first-device secret-key information received from the first device, and iv) the second-device secret-key information, to verify the one-time digest received from the proxy.

From a second aspect, the invention provides a communication system comprising:
a first device;
a second device; and
a proxy device,
wherein:
the first device stores first-device data and a first-device private key;
the second device stores second-device data and a second-device private key;
the first-device data is additionally stored by the second device and by the proxy device; and
the second-device data is additionally stored by the first device and by the proxy device,
wherein the first device is configured, in a commitment phase, to:
use the first-device data and first-device secret-key information to generate a one-time first-device commitment value, the first-device secret-key information comprising, or being derived from, the first-device private key and a first random nonce; and
send the one-time first-device commitment value to the proxy device,
wherein the second device is configured, in the commitment phase, to:
use the second-device data and second-device secret-key information to generate a one-time second-device commitment value, the second-device secret-key information comprising, or being derived from, the second-device private key and a second random nonce; and
send the one-time second-device commitment value to the proxy device,
wherein:
the first device is configured, in a checking phase, performed after the commitment phase, to communicate the first-device secret-key information to the proxy device;
the second device is configured, in the checking phase, to communicate the second-device secret-key information to the proxy device;
the proxy device is configured, in the checking phase, to use the first-device data stored by the proxy device, and the first-device secret-key information received from the first device, to verify the one-time first-device commitment value received from the first device; and
the proxy device is further configured, in the checking phase, to use the second-device data stored by the proxy device, and the second-device secret-key information received from the second device, to verify the one-time second-device commitment value received from the second device;
and wherein:
the proxy device is configured to enter a digest phase in response to a successful verification of the one-time first-device commitment value and of the one-time second-device commitment value in the commitment phase;
the proxy device is configured, when in the digest phase, to calculate a one-time digest from i) the first-device data stored by the proxy device, ii) the second-device data stored by the proxy device, iii) the first-device secret-key information received from the first device, and iv) the second-device secret-key information received from the second device, and to send the one-time digest to the second device; and
the second device is configured to authenticate the first device by using at least i) the first-device data stored by the second device, ii) the second-device data stored by the second device, iii) the first-device secret-key information received from the first device, and iv) the second-device secret-key information, to verify the one-time digest received from the proxy device.

From a further aspect, the invention provides a device configured for implementing methods steps disclosed herein as being performed by the first device. From another aspect, the invention provides a device configured for implementing methods steps disclosed herein as being performed by the second device. From another aspect, the invention provides a proxy device configured for implementing methods steps disclosed herein as being performed by the proxy device.

Thus it will be seen that, in accordance with the invention, a proxy may be used to provide brokerage, independent data validation, and confidence to the second device that the first device is who or what it claims to be—i.e., that the first device is actually the device identified by the first-device data. The first device and the second device both transmit respective one-time commitment values, derived from respective device data that is preferably unique to the device, to the proxy in a commitment phase. Then, only after both devices, and optionally the proxy, have submitted their commitment values, do the first and second devices, and optionally the proxy, reveal the secret-key information that allows the commitment values to be verified by the proxy, and optionally the first device and/or the second device. The proxy uses its stored first-device and second-device data to authenticate the first device and the second device to the proxy. Assuming this verification is successful, the proxy calculates and transmits a digest to the second device. This digest confirms the authenticity of the first device to the second device. By having the proxy attest to the authenticity of the first device in this way, the second device can authenticate the first device with greater confidence than if the second device were only to try to authenticate the first device directly without the involvement of the proxy. The device can be a simple device such as an Internet-of-Things sensor or sensor hub, or can be a more complex device such as, for example, a router.

The device data (first-device data, second-device data, and any proxy-device data) is preferably device-specific data. It may comprise provisioning data. It may comprise identification data.

The proxy may be a trusted device. In particular, the second device (and optionally the first device) may trust the proxy—e.g., as a result of a data exchange occurring prior to this method. In some embodiments, the second device (and optionally the first device) may establish trust of the proxy through at least some of the steps disclosed herein.

The proxy may store proxy data and a proxy-device private key. Optionally the proxy data is also stored by the second device, and optionally by the first device.

In some embodiments, the proxy device may use the proxy data and proxy-device secret-key information to generate a one-time proxy-device commitment value, the proxy-device secret-key information comprising, or being derived from, the proxy-device private key and a third random nonce. In a preferred embodiment the proxy may send the one-time proxy-device commitment value to the second device. It may send the one-time proxy device commitment value to the first device.

The first random nonce may be generated by the first device. The second random nonce may be generated by the second device. The third random nonce may be generated by the proxy device. Each random nonce may be generated from a source of true randomness or by a pseudo-random number generator.

In some embodiments, during the checking phase, the proxy device communicates the proxy-device secret-key information to the second device. It may also communicate the proxy-device secret-key information to the first device.

In some embodiments, the second device uses the proxy data stored by the second device, and the proxy-device secret-key information received from the proxy device, to verify the one-time proxy-device commitment value received from the proxy device. In some embodiments, the first device uses the proxy data stored by the first device, and the proxy-device secret-key information received from the proxy device, to verify the one-time proxy-device commitment value received from the proxy device.

In some embodiments, the proxy is configured to enter the digest phase only after a successful verification by the second device of the one-time first-device commitment value and of the one-time proxy-device commitment value, in the commitment phase. In some embodiments, the proxy is configured to enter the digest phase only after a successful verification by the first device of the one-time second-device commitment value and of the one-time proxy-device commitment value, in the commitment phase. The first and/or second device may communicate successful verifications to the proxy device. The first and/or second device may send one or more recalculated commitment values, calculated by the first and/or second device, respectively, to the proxy device. The proxy may enter the digest phase only after successful verification of the one-time proxy-device commitment value by one or both of the first and second devices, in addition to the successful verification of the one-time first-device and second-device commitment values.

In some embodiments the proxy additionally uses the proxy data and the proxy-device secret key information to calculate the one-time digest value.

The second device (and optionally the first device) may authenticate the first device by additionally using the proxy data and the proxy-device secret key information to verify the one-time digest received from the proxy.

The first device and/or the second device may be any electronic devices. They may be wireless devices. They may be routers and/or servers. They may be portable devices. They may be battery-powered. In a preferred set of embodiments, they are wireless sensor devices. They may communicate with each other and/or with the proxy using an IEEE802.1X protocol, for example 802.11 (WiFi™). They may communicate with each other and/or with the proxy by radio—e.g., using an IEEE 802.15 protocol such as ZigBee™ and/or using WiFi™ or Bluetooth® or any other short-range, medium-range or long-range radio protocol. However, this is not essential, and they may communicate using one or more wireless optical channels, microwave links, wired links such as such as 802.3x (Ethernet), electrical wires, fibre-optic cable, etc. The first and/or second devices may comprise Internet interfaces; they may have respective IP addresses or may have no IP addresses; they may be IoT devices.

The proxy may be any device. It may have any of the features of the first and/or second device. In particular, it may be a further sensor device. In some embodiments, the proxy is a sensor hub or a gateway.

The first device, second device and proxy may all be in proximity of each other—e.g., within less than 1 kilometer, or less than 100 metres, or less than 10 metres—or they may be distributed over larger distances or even globally.

In some embodiments, the first device or the second device may additionally act as the proxy—i.e. one physical device may be both the first device and the proxy, or may be both the second device and the proxy. However, in other embodiments the proxy is distinct from the first device and from the second device.

In some embodiments, the method may be used to authenticate a first plurality or group of devices to a second plurality or group of devices.

In some embodiments, the method may be used to authenticate a first plurality or group of devices mutually to a second plurality or group of devices.

The method may further comprise, in the digest phase, the proxy sending the one-time digest to the first device. The first device may authenticate the second device by using at least i) the first-device data stored by the first device, ii) the second-device data stored by the first device, iii) the first-device secret-key information, and iv) the second-device secret-key information received from the second device, to verify the one-time digest received from the proxy. In this way, the method may enable a mutual authentication of the first and second devices.

The second device may additionally use the proxy-device data stored by the second device, and the proxy-device secret-key information received from the proxy device, to verify the one-time digest received from the proxy, when authenticating the first device. The first device may additionally use the proxy-device data stored by the first device, and the proxy-device secret-key information received from the proxy device, to verify the one-time digest received from the proxy, when authenticating the second device.

In some embodiments, the first device and/or the second device may verify one or more commitment values, in addition to the verification performed by the proxy. This may increase the robustness of the protocol against attack. In particular, in the commitment phase, some embodiments may comprise the first device additionally sending the one-time first-device commitment value to the second device. They may comprise the second device additionally sending the one-time second-device commitment value to the first device. Some embodiments may comprise, in the checking phase, the first device additionally communicating the first-device secret-key information to the second device. The second device may then use the first-device data stored by the second device, and the received first-device secret-key information, to verify the one-time first-device commitment value received from the first device.

Some embodiments may comprise the second device communicating the second-device secret-key information to the first device. The first device may then use the second-device data stored by the first device, and the received second-device secret-key information, to verify the one-time second-device commitment value received from the second device.

The first and second devices are preferably not configured to communicate with a centralized certificate authority. They need not contain any mechanism for performing public-key cryptography. This can simplify the design of the devices and reduce processing requirements and power consumption compared with using a PKI authentication protocol.

Some embodiments may use a hash operation, such as a SHA function, to generate the respective commitment values. This typically places less computation burden on the devices than performing asymmetric key operations.

The method may comprise a handshaking phase in which one or more of the first device, the second device and the proxy device, is identified by one or more other device of the first device, the second device and the proxy device. This identification may be performed without strong authentication. It may comprise exchanging one or more relatively short hash values—e.g., 20-bit hash values-which may be derived from the device data of one or more of the devices. Each hash value may include a respective random nonce as input to the hash, so that the hash values are one-time values. Each hash value may include a respective time stamp as input to the hash. Each random nonce may be communicated by a respective device to at least one of the other devices. The handshaking may comprise the first device determining the identity of the second device by recalculating a hash value based on the second-device data stored by the first device and a random nonce received from the second device. The first device may compare the recalculated hash value with a hash value received from the second device, and identify the second device when the hash values match. Similarly, the handshaking may comprise the second device determining the identity of the first device by recalculating a hash value based on the first-device data stored by the first device and a random nonce received from the first device. The second device may compare the recalculated hash value with a hash value received from the first device, and identify the first device when the hash values match.

The method may additionally comprise a pre-deployment handshaking phase for providing the second device and the proxy with the first-device data, and for providing the first device and the proxy with the second-device data.

The one-time digest calculated by the proxy may further depend on time-stamp information from one or more of the devices. The second device and/or the first device may use the time-stamp information to verify the freshness of the one-time digest. This can help to prevent replay attacks.

The first-device commitment value or the second-device commitment value generated by the first device or the second device, respectively, may additionally depend on time-stamp information from an internal clock of the respective device. A device (e.g., the proxy) receiving a commitment value may check that the commitment value satisfies a freshness condition (e.g., being no older than 0.1 second from the current time according to a clock of the verifying proxy) as part of verifying the commitment value.

The first device may perform a milestone check in which the first device checks that the first device has performed a set of phases of the protocol. The set of phases may include the commitment phase and/or the checking phase and/or the digest phase. It may further include a handshaking phase. The checking phase may provide a key-exchange milestone and a separate checking milestone. If the milestone check fails, the first device may withdraw from the authentication method. The first device may be configured to prove to the proxy that it has performed the milestone set of phases. The second device may be similarly configured to perform some or all of these milestone operations.

The communications between the devices may be divided over two or more different channels, such as over two different radio protocols, or over a wired channel and a wireless channel. This may provide greater security.

The devices may share an encryption key—e.g., an AES key-which they may use to encrypt some or all of the data communications between the devices. However, the integrity of the authentication preferably does not rely on the security of this AES key.

The proxy and/or the first or second device may be configured to record a successful authentication—e.g., in a blockchain.

Preferably, the system is configured so that different data is exchanged between the devices every time the authentication protocol is performed. This may be achieved through the use of nonces, as disclosed herein. In this way, authentication may happen de novo each time, which can prevent an attacker from deciphering keys or certificates. Embodiments may provide quantum resistance.

Preferably, there is no permanent authentication between the devices. Authentication may occur on a need-only basis. In some cases, the authenticated status may last only for one communication session, which may last only a few seconds or less. This is particularly appropriate where the devices are mobile and may be in proximity of each other (e.g., in short-range radio range) only for a few seconds.

The commitment, checking and digest phases may be performed a plurality of times by the same first and second devices, preferably using different random nonces. The first and second devices may be configured to perform these phases (i.e. to re-authenticate) whenever a condition is met, such as whenever a communication link, such as a wireless channel, between them is (re-)established.

In one set of embodiments, the first device is a first gateway (e.g., a router or other device that allows data to move in and out of a local network that connects the first device and the second device). In some such embodiments, the second device may be a second gateway, which may interface with the same external network as the first device, or with a different external network.

The first and second gateways may be static devices (i.e. not mobile devices). They may have a persistent communication channel between them, such as a wired link.

However, it may nevertheless be desirable to perform the commitment, checking and digest phases at intervals, even when the communication channel is persistent. The devices may re-authenticate as frequently as once per second, or even more frequently—e.g., fifty or more times per second. This may provide greater security against potential attackers, by ensuring it would take far longer to brute-force crack the security than the duration of any one authentication session, thereby potentially being resistant even to quantum-computing-based attacks.

In some embodiments, the system may provide two communication channels between the first and second devices, which may be two multiplexed channels over a common medium, such as a single Ethernet cable, or which may use different respective media, such as a pair of Ethernet cables. The system may be configured so that, at any point in time, at most one of the two channels provides an authenticated channel, having been used to perform commitment, checking and digest phases as disclosed herein, while the other channel is disconnected (i.e. is not used for any data communication) or is used only for insensitive communications. The authenticated channel may be used for sensitive communications. The devices may alternate which of the two channels is the authenticated channel, at intervals, which may be regular intervals. Re-authentication may be performed each time the identity of the authenticated channel changes. This alternating may occur as frequently as once per second, or even more frequently—e.g., fifty or more times per second. This may provide greater security against potential attackers, by ensuring it would take far longer to brute-force crack the security than the duration of any one authenticated channel, thereby potentially being resistant even to quantum-computing-based attacks. Of course, there may be three or more channels, a subset of which is authenticated at any particular time.

The device data may comprise one or more properties, such as a model number, a unique ID, a class, an owner, etc. which may be specific to a particular device or class of devices. By selecting and/or combining appropriate properties, device data may be defined that is unique to each device within the network. The private keys may be generated using a device property. They may be generated during boot up of each device.

The devices may be provisioned to communicate with each other. Provisioning is typically different from authentication. It may be a necessity for the devices to be provisioned for mutual communication before initiating the authentication protocol.

Each device may comprise software instructions, for execution by a processor, for implementing one or more steps disclosed herein. The software may be stored in a memory of the device. Each device may comprise one or more of: central processing units (CPUs), digital signal processors (DSPs), graphics processing units (GPUs), field programmable gate arrays (FPGAs), application-specific integrated circuits (ASICs), volatile memory, non-volatile memory, inputs, outputs, displays, network connections, power supplies, radios, clocks, and any other appropriate components. It may be configured to store or display or output a result of the authentication.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
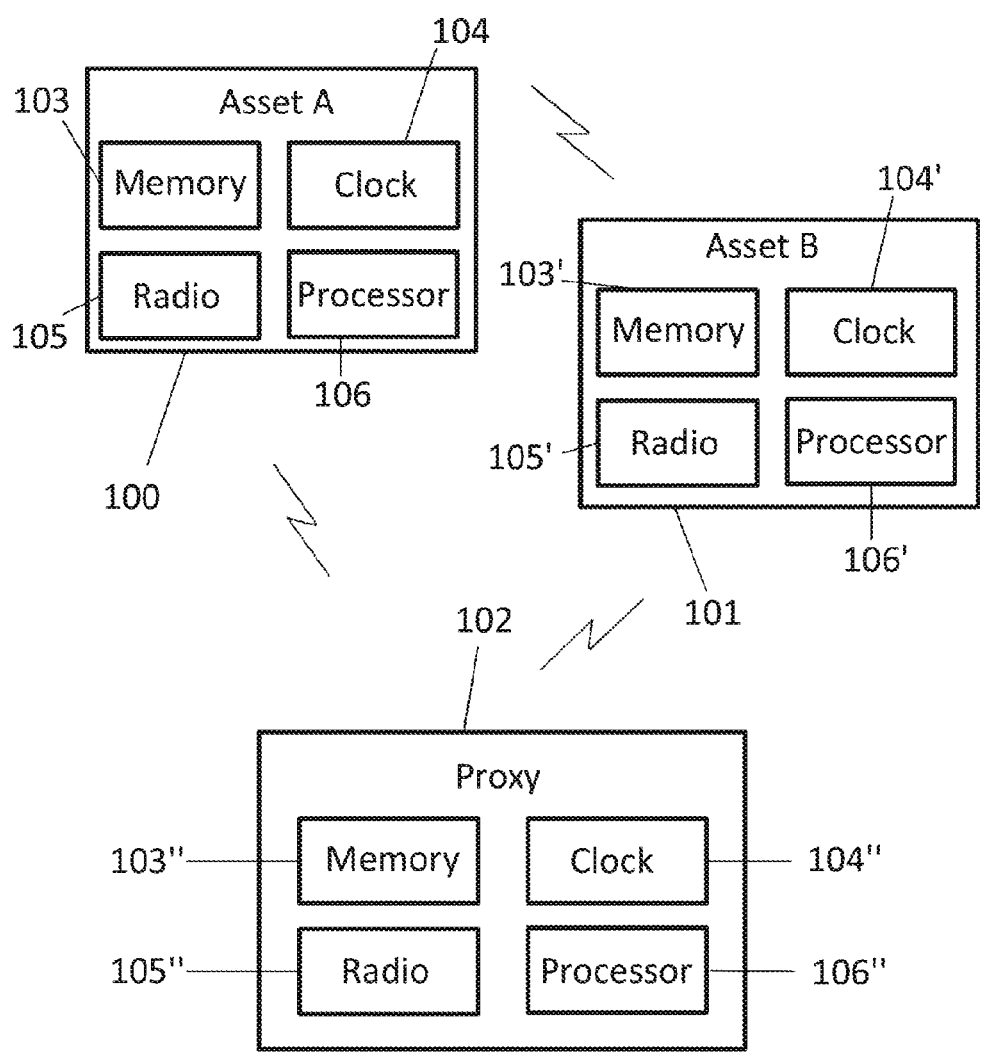
FIG. 1 is a schematic diagram showing two assets and a proxy, which are configured to participate in an authentication protocol embodying the invention.

FIG. 1 shows components of a wireless sensor network comprising an asset A 100, an asset B 101, and a third asset, referred to as a proxy 102 or asset P, that are configured to take part in an authentication protocol embodying the invention. The network may contain many more assets than this. Each of these assets contains a respective memory 103, 103', 103", a clock 104, 104', 104", a radio 105, 105', 105" and a processor 106, 106', 106". The memories 103 may store software comprising instructions for executing on the respective processors 106 in order to carry out some or all of the steps described herein. Alternatively, the assets 100, 101, 102 may contain dedicated hardware, such as crypto-accelerators (not shown), for carrying out at least some of the steps. The assets 100, 101, 102 may contain batteries, user interfaces, sensors, etc. They communicate with each other by radio.

These assets can be, for example, Internet-of-Things sensors or sensor hubs. For example, asset A 100 could be a sensor located in a lamppost, asset B 101 could be a sensor located in a vehicle, and the proxy 102 could be a sensor embedded in the road, close to the lamppost. During the brief time window that the vehicle passes in radio proximity to both the lamppost and the road sensor, the vehicle sensor B may wish to authenticate with the lamppost sensor A before exchanging sensor data from the lamppost sensor A. The authentication is secured by additionally communicating with the road sensor 102, as described in more detail below. In some embodiments, one or both of the assets A and B 100, 101 could be gateway devices, interfacing between two different networks, such as a local-area network and the Internet.

Figure 2:
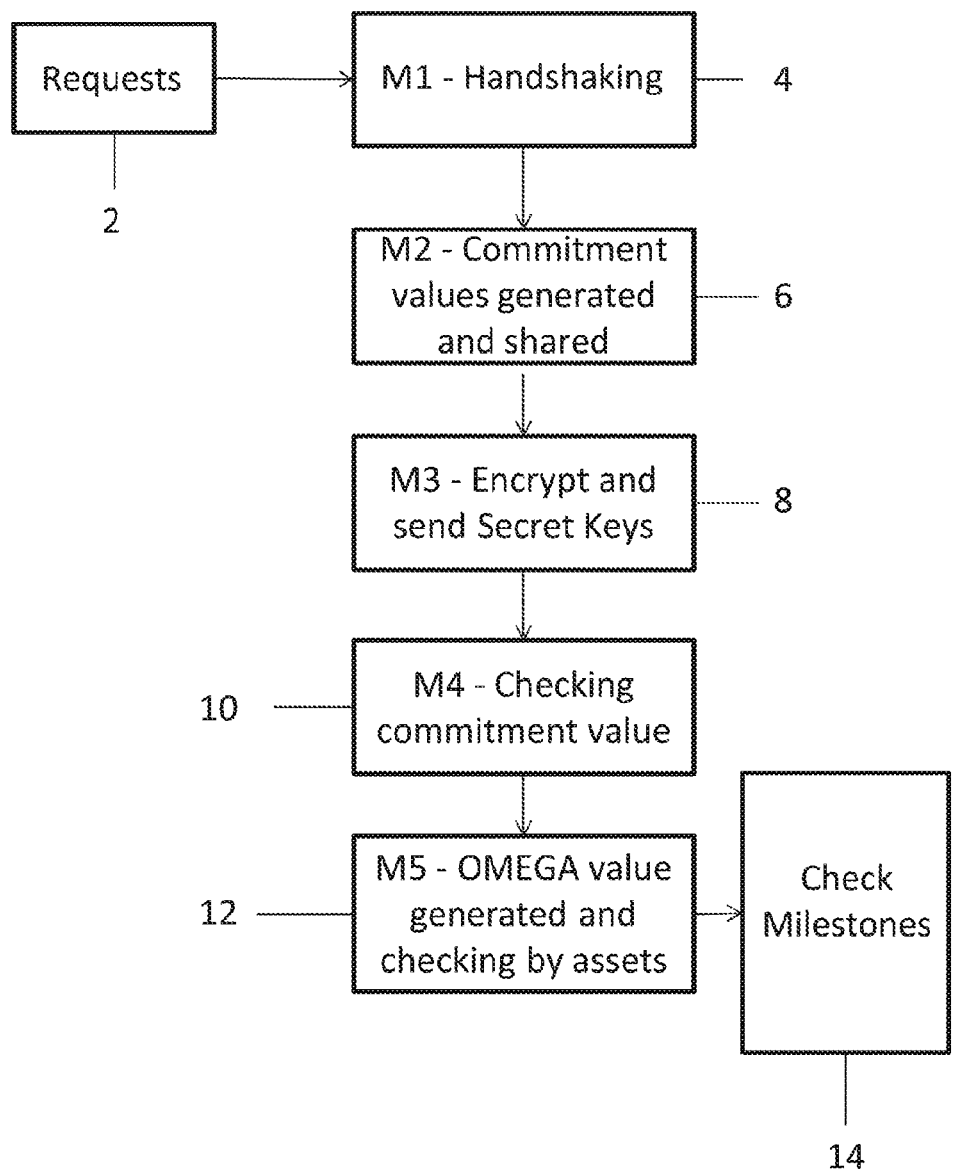
FIG. 2 is a flow chart showing the main phases of an authentication protocol embodying the invention.

FIG. 2 shows an overview of an authentication protocol which is an embodiment of the present invention. It may be implemented in the sensor network of FIG. 1, or another network.

The protocol begins with an asset (e.g., asset A 100), or group of assets, which will be referred to as Asset A, issuing an authentication signal to another asset (e.g., asset B 101), or group of assets, which will be referred to as Asset B. This signal is referred to in FIG. 3 as "AUTH_PROB_AB". Upon receipt of this authentication signal, Asset B issues an authentication request to a third asset (e.g., proxy 102), referred to as a "Proxy" or Asset P. This signal is referred to in FIG. 3 as "AUTH_REQUEST_BA". This proxy then issues a further request, referred to as "PROXY_AU-TH_REQUEST", to both of the assets A and B, and the authentication proceeds once each asset successfully receives this request from the proxy. This all takes place at the "Request" step 2 of the flow chart of FIG. 2. It is shown in more detail in FIGS. 3 and 4.

A request is made each time authentication (referred to as 2BPA authentication) is required, and an asset's authentication ceases as soon as the particular communication, for which authentication was required, ceases. Authentication according to the present disclosure is referred to as "2BPA" authentication since it takes place between two assets, labelled as "A" and "B" and a proxy device "P". As a result, the authentication is "always off" other than when it is deliberately in use, so that there is no permanent authentication for any assets; in other words, authentication occurs on a need-only basis, thereby improving the security of the protocol.

The requests (AUTH_PROB_AB, AUTH_RE-QUEST_BA, PROXY_AUTH_REQUEST) are all issued on a first communication band, referred to as Band 1, which could be an 802.15.x channel.

More generally, the protocol can be carried out with all communications being transmitted on a single communication band, Band 1. However, in a preferred embodiment, two different communication bands are used to transmit the data at different points during the protocol. These communication bands can be for example any kind of WiFi™ connection, Bluetooth®, or wired connection—for example, Band 1 could be an 802.11.x wireless channel while Band 2 could be an 802.15.x wireless channel.

In order for Asset A to authenticate with Asset B and the proxy, this particular example embodiment requires that all the assets must have identical provisioning characteristics, meaning that they must all be permitted to communicate with all the same assets. The assets must have identical natural properties, NP, where these natural properties can comprise any combination of alphanumeric characters, real numbers, dates, times or group identities. Other embodiments may not have this requirement.

The next phase in the authentication protocol is referred to as "Handshaking", shown at step 4 of FIG. 2. There are two alternative "Handshaking" phases. The first 4a, shown in detail in FIG. 3, only takes place during initial deployment of a group of assets, for example when the assets are all configured in the factory. The second, alternative "Handshaking" phase 4b takes place during any authentication which occurs "after deployment" (e.g., following initial deployment from the factory), for example when the sensors have been installed in other devices; this phase 4b is shown in detail in FIGS. 4a & 4b.

Figure 3:
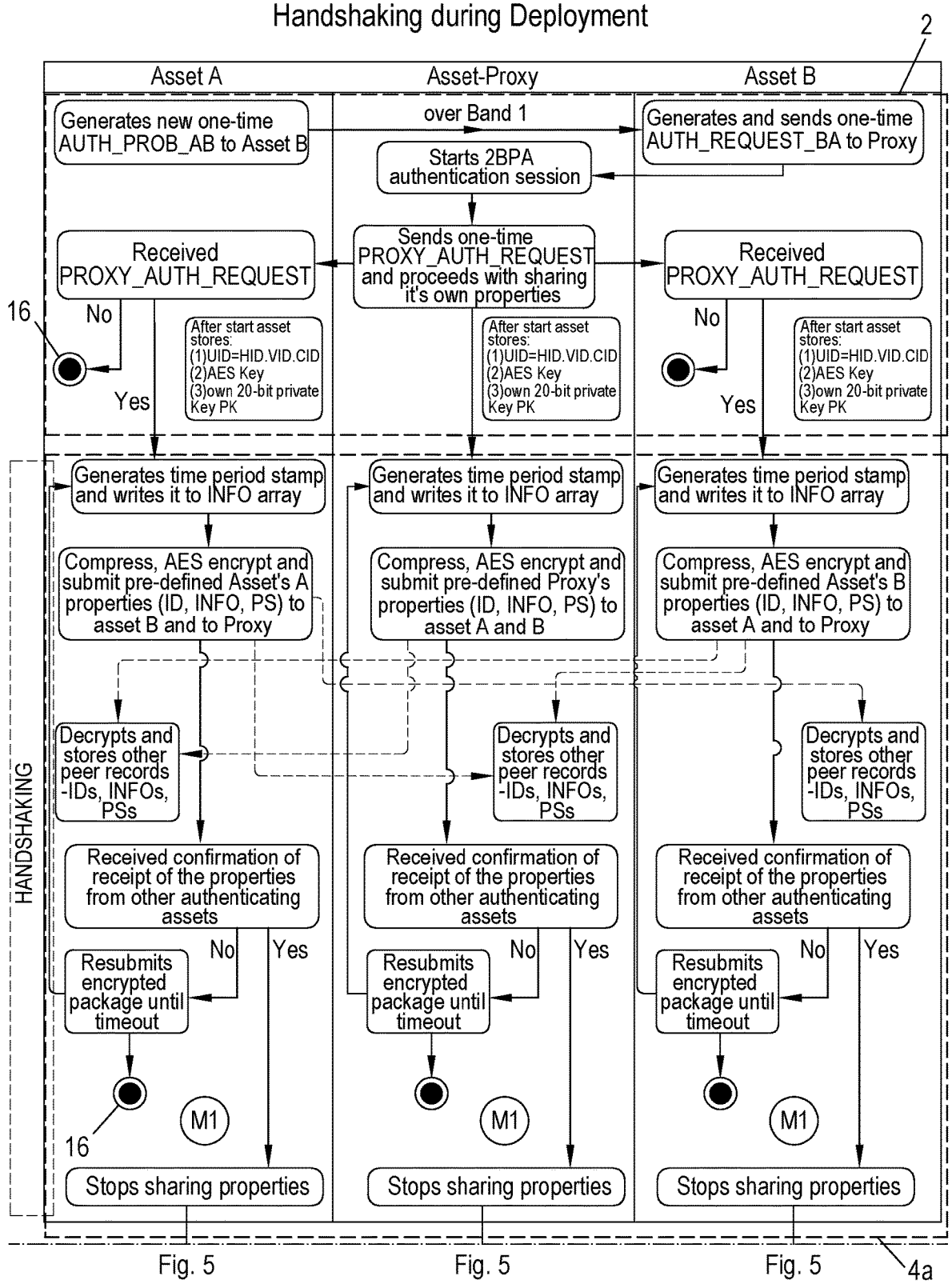
FIG. 3 is a flow chart providing a more-detailed view of the "Handshaking" phase of the authentication protocol as it is implemented during initial deployment of the assets.

When Handshaking takes place during initial deployment of the assets as detailed in stage 4a of FIG. 3, each asset, or group of assets, compresses certain properties, encrypts these properties and shares them with the other assets. These properties can include a unique ID, "UID", which is a concatenation of the asset's Hardware ID, Virtual ID, and Customer ID, as well as an "INFOx", which is a set of data representing unique properties of asset x, plus a time stamp value based on an internal clock of the particular asset, and a "PSx" which is the provisional spec or permissions that the asset has (e.g., permissions Time On|Off, one-time duration of work, intervals of work, conditional, exception, Implied, is/is not, More/Less, At least, . . . ). The internal clocks of the sensors may be synchronised during an initial set-up phase and/or at intervals thereafter, using a known synchronisation method. The Hardware ID is a unique ID baked-in when the asset is being manufactured. The Virtual ID is a randomized SHA-3 hash value of the asset's namespace created during the asset's first start. The Customer ID is the unique customer ID of the customer to whom the asset belongs, and is created during initial protocol deployment. Each asset then uses an AES key, which is a key pre-installed on all assets by the customer or manufacturer, to encrypt these properties. These compressed and encrypted properties are then shared with all assets participating in the authentication process over communication Band 1. Each asset then awaits confirmation of receipt of the properties by all the other assets, and resubmits these properties until either receiving this confirmation or until timeout. All of these shared properties are stored by every asset permanently in the memory 103 of each asset.

Each asset has, pre-set, values that include: Hardware ID, Model Name, Model ID, Serial Number, etc. When booted, each asset generates its Unique ID=Hardware_ID, Virtual_ID, Customer_ID.

Every asset, including the trusted proxy, should also have the following values defined, before the authentication begins:

INFO data for participating in authentication (excluding a time stamp, which is added during the authentication process);

provisional spec data for participating in authentication;
a common AES-128 encryption key to start sharing encrypted data between assets;
a Handshaking timeout;
a Commitment exchange timeout; and
a Secret Key exchange timeout.

Figure 4A:
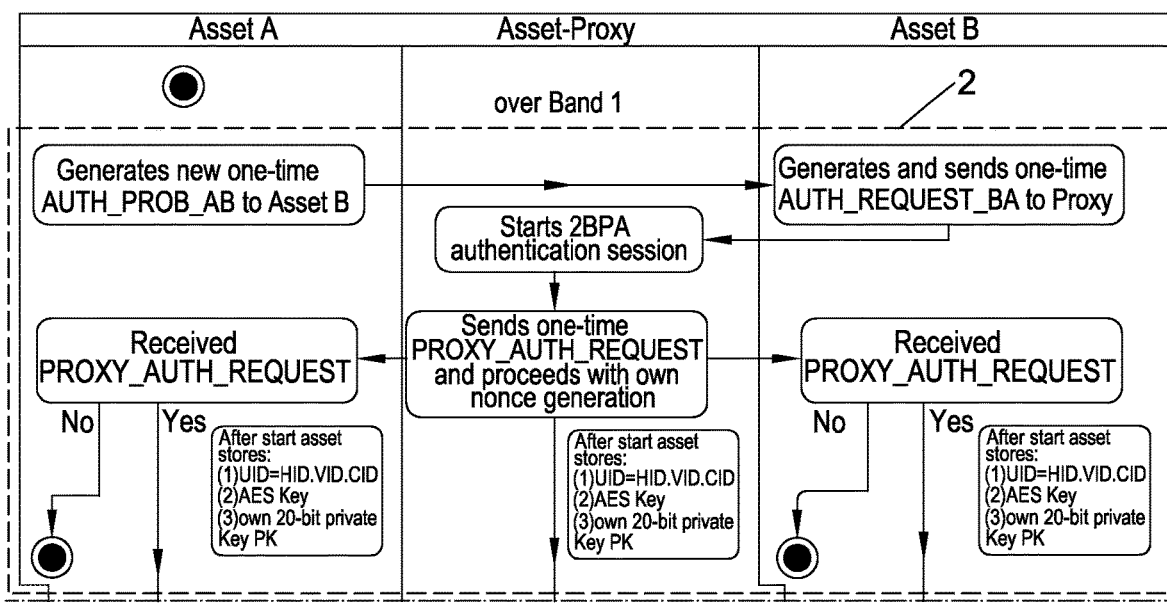
FIG. 4a is a flow chart providing a more-detailed view of the first part of the "Handshaking" phase of the authentication protocol as it is implemented when authenticating the assets after the initial deployment of the assets.
Figure 4B:
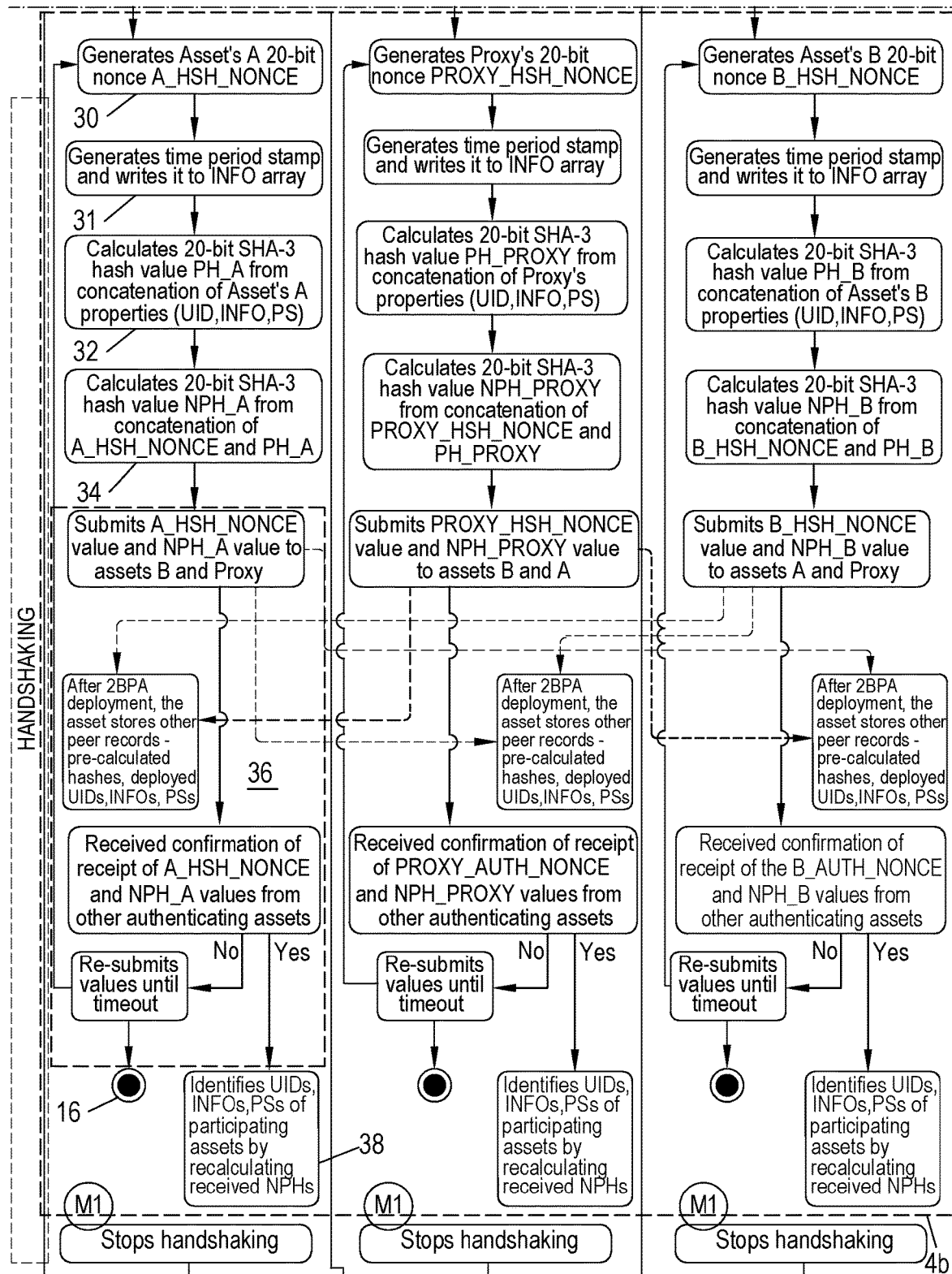
FIG. 4b is a flow chart providing a more-detailed view of the second part of this after-deployment "Handshaking" phase of the authentication protocol.

When Handshaking takes place after initial deployment of the assets, as shown at stage 4b of FIGS. 4a & 4b, none of the asset's properties are shared directly, so as to improve the security of the protocol. Rather, each asset (including the proxy) generates a 20-bit nonce, a random number which is used only once, at stage 30. Each asset then generates a time stamp and writes this to its respective INFO array, at stage 31. Each asset then calculates a 20-bit SHA-3 hash value, PH (properties hash), from a concatenation of its own properties—UID, INFO, PS—at stage 32. Each asset then calculates a further SHA-3 hash value, NPH (nonced properties hash), from a concatenation of the nonce, from stage 30, and the property hash value, from stage 32, at stage 34. Each asset then submits both its NPH hash value and its nonce value to all other assets over Band 1, and keeps sharing these values until confirmation is received or until a timeout, as shown at stage 36 in FIG. 4b.

If, at any stage, an asset does not receive confirmation of receipt of details which are being transmitted to the other participating assets, and a timeout limit is reached, then the asset ceases to participate in the authentication session, as is indicated by a black circle symbol 16 in the flow charts. If it is the proxy that reaches such a state, the proxy will stop the entire authentication session (not just its own participation).

Upon receipt of the NPH and nonce values from other assets, each asset then uses the stored records it obtained during the deployment stage 4a to identify the properties of the participating assets by recalculating the received NPH values, as shown at step 38.

Completion of either of these alternative "Handshaking" steps 4a or 4b is recorded as a first "milestone" M1 by each of these assets. Each asset must pass through five milestone steps in the authentication protocol, as shown in FIG. 2, as well as the final phase of the protocol, before an asset is granted an authenticated status. Assets therefore need to note (e.g., store a flag in memory) that they have passed through each of the five required milestones. An explanation of how this is checked is given later with reference to FIG. 8.

Figure 5:
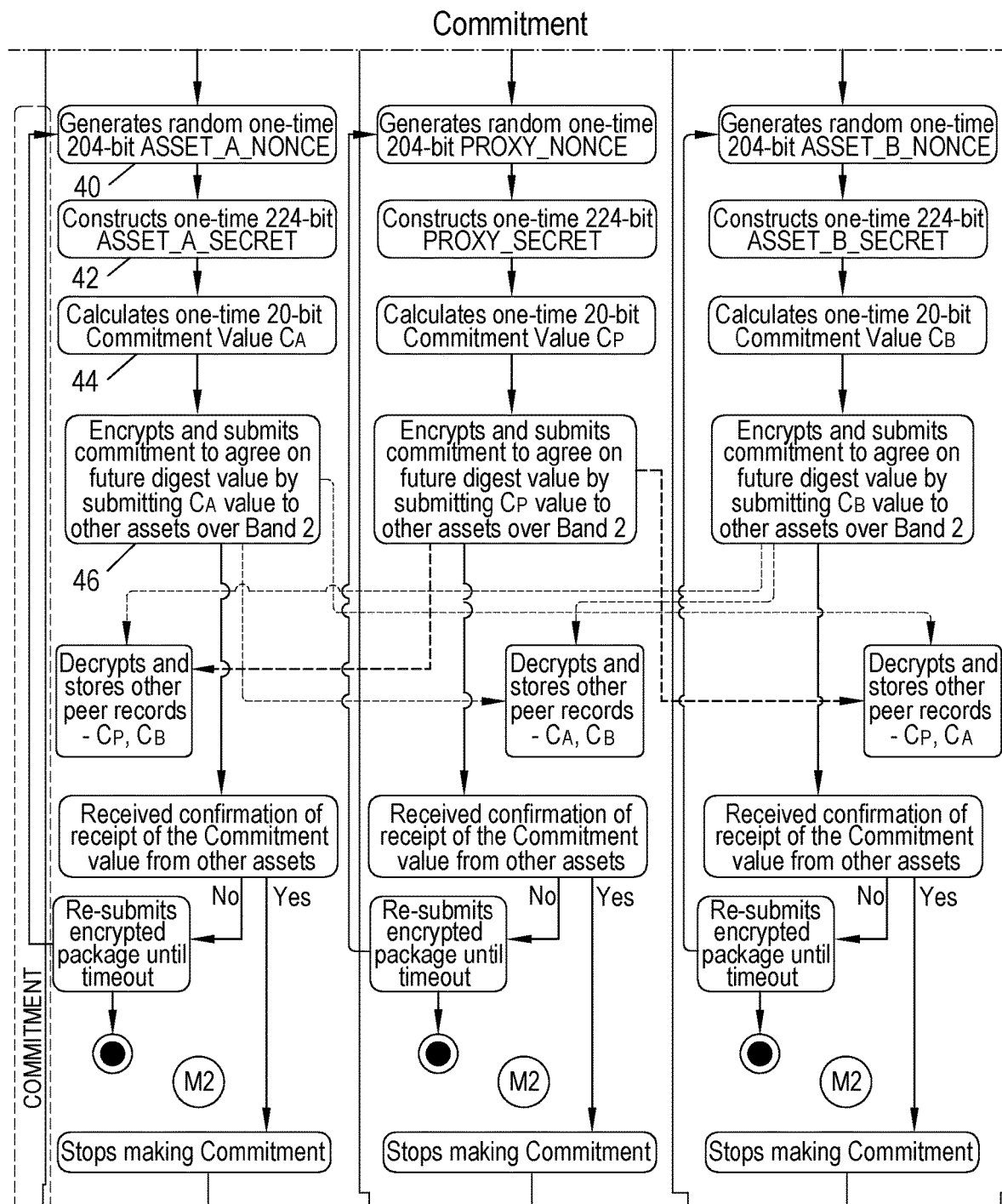
FIG. 5 is a flow chart providing a more-detailed view of the "Commitment" phase of the authentication protocol.
Figure 5:
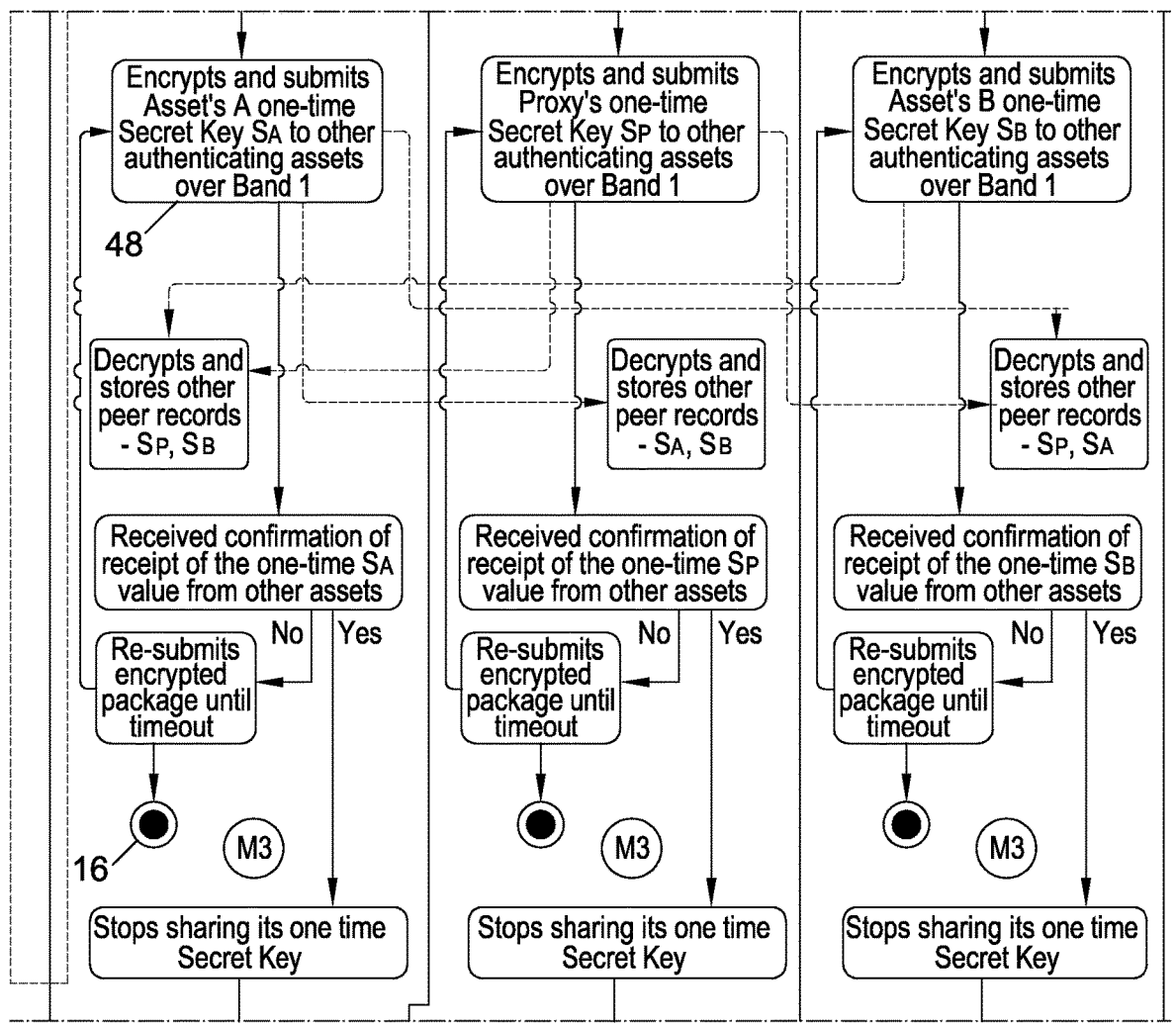

After "Handshaking", the assets proceed to a "Commitment" phase 6, shown briefly in FIG. 2, and in more detail in FIG. 5. In this phase 6, each participating asset first generates a 204-bit nonce at step 40. Each asset then takes its own private key, which is a 20-bit key individual to each asset, created during operating-system boot of the asset, based on the asset's UID and never shared, and concatenates this private key with the nonce generated at step 40, to generate a one-time 224-bit secret key at step 42. Since this secret key includes a nonce, it is different during each authentication session and unique to each session.

At step 44 each asset then calculates a respective commitment value, $C_x$. The commitment value is calculated as a SHA-3 hash function, $$C_x = \text{hash}_{S_x}(UID_x, INFO_x, PS_x)$$

where $S_x$ is the secret key of asset x, generated at step 42, $UID_x$ is the concatenation of the Hardware ID, Virtual ID and Customer ID of asset X, and $INFO_x$ is a set of data describing asset X (i.e., unique properties of asset X). This $INFO_x$ value includes a time-period-stamp so that this INFO value is specific to a particular authentication session and is time bound. The time stamp is based on the internal clock of each asset, and these clocks are synchronised during the initial setup process. $PS_x$ is the provisional spec, or permissions, of asset X. These commitment values are therefore different in every authentication session and unique to each session. Since unique keys are generated between assets in each authentication attempt, there are no permanent keys or certificates that could be hacked by an attacker.

Each asset then encrypts its own commitment value using the common AES key and submits its encrypted commitment value to all other participating assets over the second communication channel, Band 2, at step 46. (Use of a second band may provide additional security; however, in some embodiments only one band, Band 1, is used instead.) Each asset then decrypts and stores the commitment values received from all other participating assets. Each asset continues to re-submit the encrypted commitment values until confirmation is received, or until a Commitment exchange timeout is reached. Once confirmation is received by an asset, for example asset A, that all other assets have received the commitment value sent by asset A, asset A is deemed to have reached the second milestone, M2.

Each asset then encrypts its one-time Secret Key using the AES key stored by all assets, and submits this Secret Key to all other participating assets over communication Band 1, as shown at stage 48 of FIG. 5, and stage 8 of FIG. 2. As with the commitment value, each asset re-submits this Secret Key value until confirmation is received from all other assets of receipt of the Secret Key, or until a timeout limit is reached, in which case the particular asset which has reached the timeout limit ceases to participate in the authentication protocol, as shown at symbol 16. Once confirmation is received from all other assets of receipt of an asset's Secret Key value, that asset is deemed to have reached the third milestone, M3. Each asset stores the received Secret Keys of the other assets for a particular authentication session for the duration of that particular session.

Figure 6:
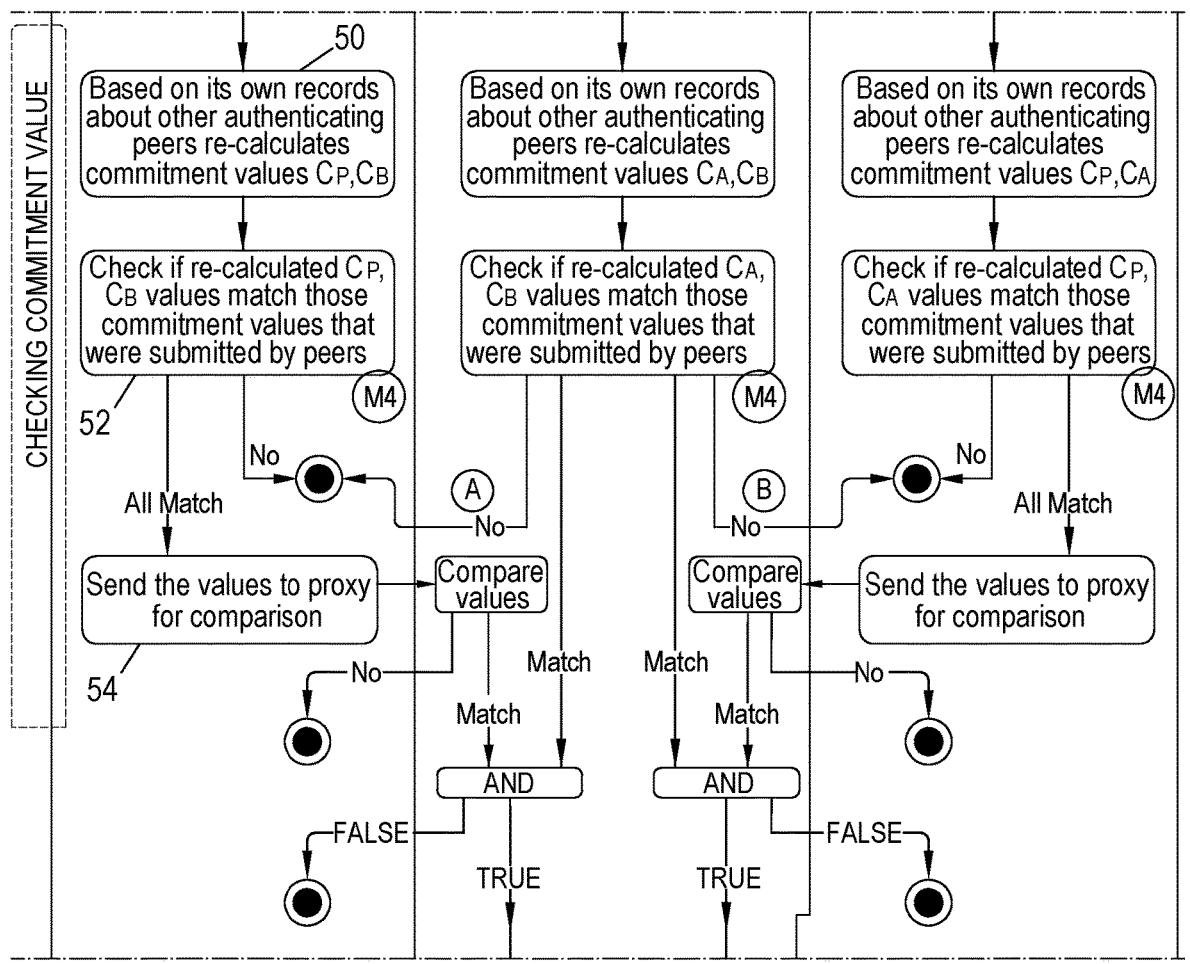
FIG. 6 is a flow chart providing a more-detailed view of the "Checking" phase of the authentication protocol, in which the commitment values are checked.

The next phase in the authentication protocol is for each asset to check the commitment values submitted by all other assets, at the "Checking commitment value" phase, shown in stage 10 of FIG. 2, and in more detail in FIG. 6. At this phase, each asset uses its own records of the properties of other authenticating assets, which were stored during the initial pre-deployment Handshaking stage 4a, and which were identified during Handshaking stage 4b, together with the secret key values stored after the previous phase, to calculate expected values for the commitment values of each other participating asset, as shown at stage 50.

For example, asset A has determined at stage 4b which stored UID, PS and INFO values correspond to asset B. Asset A then calculates the commitment value hash function given above, using these values (including, in the INFO value, the current time stamp according to the internal clock of Asset A), and using the Secret Key for asset B which was previously submitted to asset A on communication Band 1.

Each asset then checks whether there is a match between the commitment values initially submitted by each of the other assets and the recalculated commitment values, at stage 52. If they do not match, the asset ceases to participate in the authentication process. If they do match for a particular asset, e.g. asset A, this asset is deemed to have reached the fourth milestone of the authentication process, M4. If they match, each asset then submits these recalculated commitment values to the proxy 102 at stage 54, and the proxy checks whether there is a match between the commitment values initially submitted by the other assets (e.g., asset A and asset B) and the recalculated commitment values received from these other assets. If the values do not match, then the asset for which the commitment values do not match ceases to participate in the authentication process. In some embodiments, the fourth milestone, M4, for each asset, is not reached until the proxy has carried out this further check.

Figure 7:
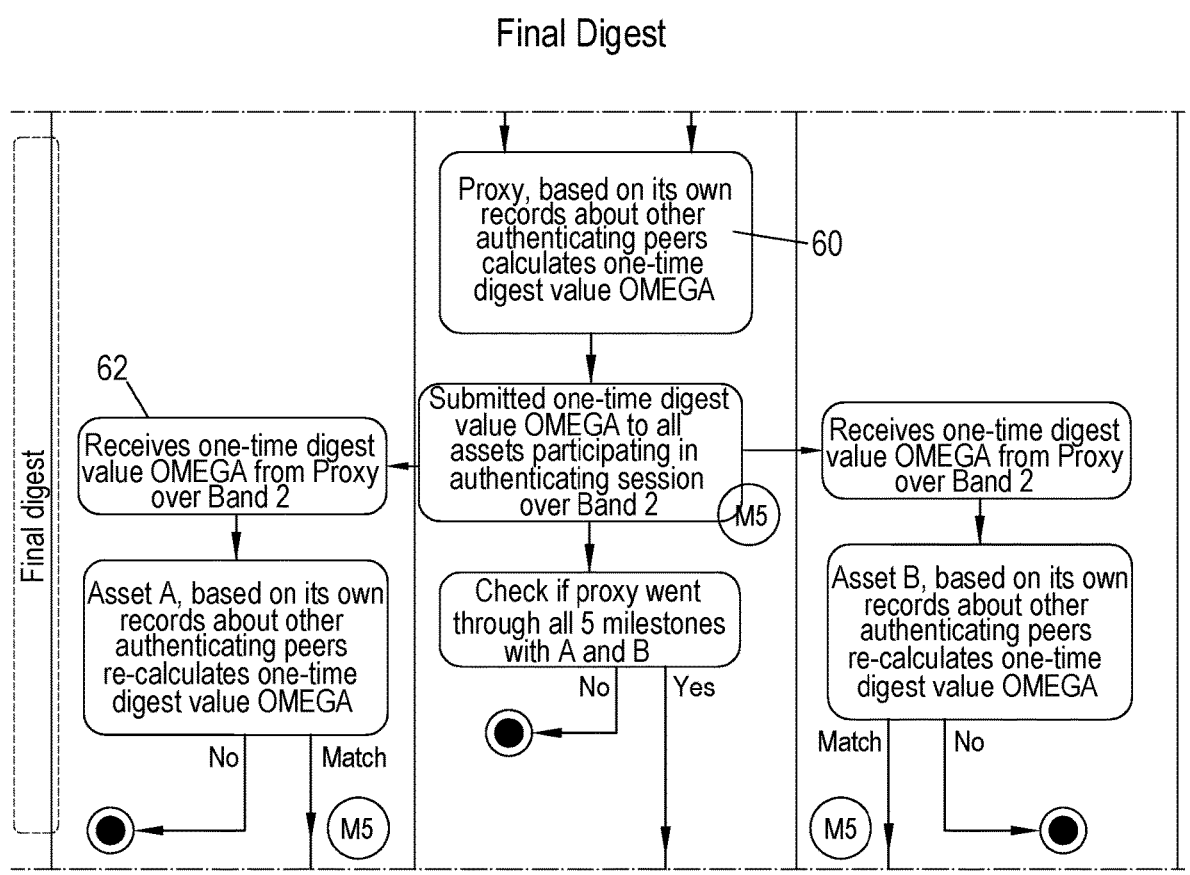
FIG. 7 is a flow chart providing a more-detailed view of the "Final Digest" phase of the authentication protocol, in which a final digest value is generated and shared.

The process then proceeds to the "Final Digest" phase, shown at stage 12 of FIG. 2, and in more detail in FIG. 7. At this phase the proxy then generates an OMEGA value, also referred to as a Final Digest value, based on the stored record it has of the properties of the other participating assets, as shown at stage 60. Specifically, this OMEGA value is given by $$\Omega = \text{hash}_k(\text{INFOS}),$$

where $$K = S_A \oplus S_B \oplus S_P$$

where Sx is the secret key of asset x, and where $\oplus$ represents bitwise XOR.

INFOS is a concatenation of the information for every asset participating in the authentication protocol, sorted in alphabetic order before the concatenation: $(UID_A, INFO_A, PS_A)$. $(UID_B, INFO_B, PS_B)$. $(UID_P, INFO_P, PS_P)$.

Although the authentication protocol has been exemplified for two assets and a proxy asset, it will be appreciated that it can be extended to any number of assets. In this case, INFOS will be the concatenation of the information for all of the participating assets, and k will be the bitwise XOR of the secret keys of all the participating assets.

This OMEGA value is then sent from the proxy to every asset over communication Band 2, at stage 62. Each asset then re-calculates the OMEGA value using its own stored data about all the other authenticating assets, at stage 62, and then indicates whether these values match. Once it is confirmed by an asset (e.g., asset A) that its recalculated OMEGA value matches the OMEGA value submitted by the proxy, that particular asset is deemed to have reached the fifth milestone, M5. Each asset that recalculate and verifies this OMEGA value thereby determines that this value has been provided by a genuine proxy which participated in the authentication session from the beginning.

The role of the proxy is to act as an independent third body possessing a certain level of trust (because it has been authenticated before and is authorized to play role of proxy for the authentication of specified types of devices, using specific bands, etc.) to ensure independent facilitation of authentication session, validation of commitments made by assets A, B and other participating assets (if any) and to broadcast the final digest value $\Omega$ among authenticating assets that cannot be changed by the assets. The value $\Omega$ is, however, received and re-calculated by the assets to eliminate the possibility of spoofing the proxy.

Figure 8:
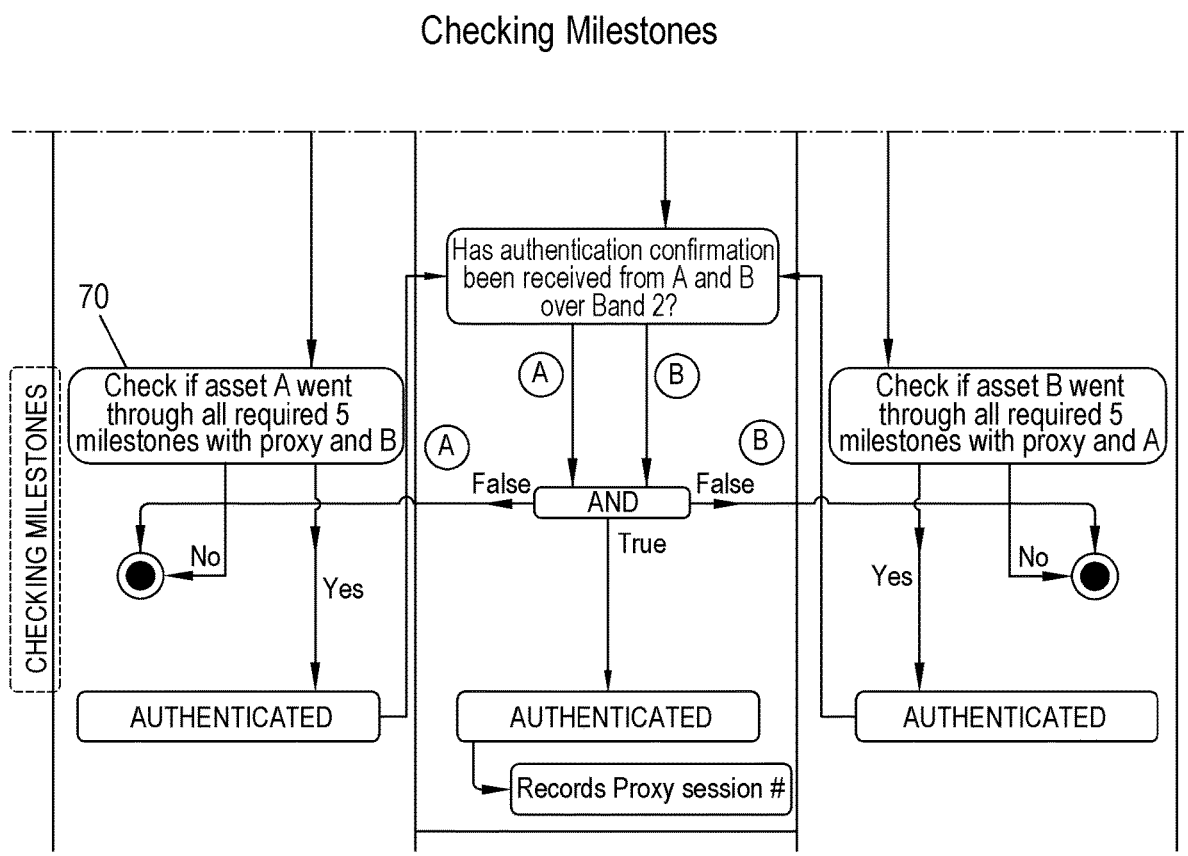
FIG. 8 is a flow chart providing a more-detailed view of the final "Milestones" phase of the authentication protocol, in which it is checked that each asset has passed through each required milestone.

The final phase in the authentication protocol is then to check that each asset has passed through all of the required milestones, as shown in stage 14 of FIG. 2, and in more detail in FIG. 8. This phase ensures that a malicious asset cannot "sneak in" during an authentication protocol.

In order to check that a particular asset, e.g. asset A, went through all of the five required milestones, a step 70 is performed in which the asset X generates a 224-bit length string:

$$M = \text{hash}(H_P, C_P, C_x, \Omega)$$

where $H_P$ is the compressed AES encrypted properties of the proxy, $C_P$ is the proxy's commitment value, $C_X$ is the commitment value of the asset itself, and Ω is the final digest value, as described above with reference to FIG. 6. Each of these properties is calculated or received by the asset X prior to a respective one of the required milestones, and therefore corresponds to a particular milestone. Therefore, correct generation of this value confirms that a particular asset has passed through all of the milestones.

Although not shown explicitly in FIG. 8, within the checking step 70, this generated value is then sent to the proxy, which recalculates the value M using its own records of the required values. If these values match then the proxy generates a 224-bit Unique Authentication Number (UAN), where $$UAN=\text{hash}(M)$$

and submits this UAN number to all of the assets participating in the authentication protocol. After receipt of this number, each asset (e.g., asset A) receives an "authenticated" status with the proxy and with all of the other participating assets, shown by the "Yes" branches in FIG. 8, which lead to respective "Authenticated" boxes. The same process is applied to every other asset participating in the authentication process. These UAN numbers can be recorded and stored if required, for example it can be recorded into the blockchain.

After the assets are authenticated, the provisioning of each asset may allow assets with particular permissions to communicate specific types of data to specific assets over specific ports and/or to access specific sources of data. For example, if PSx data is provisioned, successful initial protocol deployment automatically authorizes participating assets to complete specific actions defined in PSx. Every consequent successful authentication run for the assets (using the after-deployment handshaking) automatically authorizes the assets to complete the same action with no necessity to provision the authorization for the assets again to execute the same actions.

Although Asset A has been used as an example in places within this description, it should be understood that the description applies likewise to Asset B, and to the case where one or both of these assets actually comprises a group of assets, and to a situation in which there are three or more assets, in addition to the proxy, that are mutually authenticating. The protocol allows authentication simultaneously of an arbitrary number of assets.

In the above described example two communication bands, Band 1 and Band 2, are used, with Band 2 being used for sharing the commitment values and the final OMEGA value, and Band 1 being used for all other data exchange during the authentication session. In the event that only one communication band is available the authentication protocol can proceed with all communications being transmitted on a single band, either of Band 1 or Band 2.

The authentication protocol embodiment described above is believed to provide a method of point-to-point quantum-resistant authentication that allows any two digital assets or groups of assets to securely authenticate with one another without the need for third party certificates or the public key infrastructure. Further, no Internet connection, centralized means of communication, or third party database is necessarily required by either asset or groups of assets to complete the authentication process, thereby allowing decentralized real-time, 'de novo', always-off, as-needed, authentication. After the initial deployment "Handshaking" phase of FIG. 3, all data values being exchanged between participating assets during the run of an authentication session are randomized, one-time, one-way, never-the-same (within SHA-3 capability) values, meaning that the proof is zero-knowledge, as each asset proves its identity to the other participating assets without explicitly revealing any identity data via a communication band. This brings quantum resistance of the protocol and leaves no reason to replay or to eavesdrop. This offers an advantage over using, for example, merely relying on the shared AES key for authentication, which is used multiple times and is a symmetric block cipher. If the AES key becomes known to an adversary the authentication process is compromised. By contrast, in the above-described authentication protocol embodiment there is nothing to compromise, since commitment values and secret keys which are shared between assets are all one-time values which are specific and unique for every session.

In order to further explain the advantages of the above described authentication protocol embodiment, there follow below some examples of possible malicious attacks which might be deployed against the protocol. For each possible attack, an explanation is provided of how these attacks are believed to be countered by the protocol. These statements relate only to the example embodiments disclosed with reference to the accompanying drawings; they are not necessarily all equally applicable to every embodiment of the invention.

Eavesdropping Attack

An attacker taps the information that goes on the wire or wireless and uses it for future purpose. It is a kind of replay attack. It may be network eavesdropping or offline eavesdropping.

During the run of this protocol there is no reason to eavesdrop since all exchanged data values during after-deployment-authentication session are random one-time one-way (non-reversible) values. Since the Asset-attacker did not participate in an initial protocol deployment session, which, in this embodiment, is mandatory for the assets running the protocol for the first time, it has no initial knowledge about real properties (UID, INFO, PS) of Asset A (as well as, Proxy and other assets in the group), Consequently, an Asset-attacker will not be able to re-calculate the correct commitment values of other the participating assets to prove a match at the CHECKING COMMITMENT VALUE phase of the protocol, shown in FIG. 6.

An asset-attacker must submit the recalculated value of the commitments made by other assets (not just a logical TRUE or FALSE signal indicating a match) and the proxy checks if there is a match of the other asset's commitment value provided originally by the other assets and the one provided by Asset-attacker on behalf of eavesdropped asset. If the proxy does not find a match, the asset, which recalculated the non-matching commitment value (i.e. Asset-attacker), will be denied and reported.

The data eavesdropped in a current session will not be useful for the next session if replayed, because at the Handshaking phase, shown in FIGS. 4*a* & 4*b*, Asset-attacker will fail to derive real properties of other participating assets and Proxy from received hash values because of it lacks initial knowledge about their real properties (UID, INFO, PS). This will lead to the Asset-Attacker failing to re-calculate the correct commitment values for the other participating assets and Proxy at the CHECKING COMMITMENT VALUES phase, shown in FIG. 6. Again, if the proxy does not prove a match, the asset, which recalculated the non-matching commitment values (i.e. Asset-attacker), will be denied and reported.

Although during initial deployment the assets share AES encrypted values of UID, INFO, PS, during the Handshaking phase of FIG. 3, this initial deployment takes place only once and, again, this shared data will be worthless in any future after-deployment authentication sessions.

Man-in-the-Middle Attack

MITM is a kind of eavesdropper attack. An attacker comes in between two assets, or asset and proxy and all the communication between them goes only through the attacker. So he impersonates both the parties to one another and may copy, alter or delete a portion of the data traffic between them i.e. attack on mutual authentication. It may be a passive attack or active attack.

To prevent MITM attack the assets and proxy are being mutually authenticated during one-time initial protocol deployment by sharing their AES-encrypted real properties (UID, INFO, PS) between each other. Assuming the MITM impersonates an authenticated asset, since the MITM did not go through initial protocol deployment phase and it has no initial knowledge about real properties of already authenticated assets and proxy. The MITM will fail to recalculate correct commitment values for authenticated assets and Proxy at the CHECKING COMMITMENT VALUES phase of FIG. 6, and will not be authenticated, i.e. not trusted, to perform specific actions on behalf of any asset it may want to impersonate.

Forged Asset

In this attack the asset-attacker acts as a copy (clone) of a legitimate asset (which was burnt, for example) and the attacker attempts to participate in an authentication session with other assets by issuing an authentication request to the proxy as a legitimate asset would do after a disconnect had occurred for some reason.

Even knowing the AES encryption key, the forged asset would fail to successfully pass the CHEKING COMMITMENT VALUE phase of FIG. 6. The after-deployment protocol data exchange is a zero-knowledge proof, i.e. an asset and/or proxy shares only hashed values of its identity data (UID, INFO, PS) to other participating assets without explicit revealing its real identity data to the other assets.

Even if a forged asset were a total clone of a genuine asset and therefore knew INFO and PS data, it would be denied and reported at the CHEKING COMMITMENT VALUE phase of FIG. 6 because it would have a NULL or different randomized unique ID UID=HID·VID·CID, which is used to calculate the commitment and final digest values, as explained above.

If an asset-attacker was somehow able to sneak-in to the group of assets during the very first one-time protocol initial deployment phase, during which the assets share their properties, this would fail, because the illegitimate asset would need to have a fresh AES encryption key installed. This AES key is pre-installed only on legitimate assets before they go through the initial deployment version of the above described protocol.

Forged Proxy

In this attack an attacker acts as a legitimate proxy that facilitates an authentication process for other assets and responds to legitimate asset's challenges (requests) to authenticate.

Since the protocol implements a mutual authentication approach, all assets check the proxy's commitments too. Due to this feature the forged proxy case is similar to the forged asset case discussed above. The difference is simply when the proxy will be denied and reported. On the CHECKING COMMITMENT VALUE phase of FIG. 6 the proxy checks and decides if an asset will proceed to next phase of the authentication process, genuine authenticating assets will not recognise a forged proxy at this phase. However, at the FINAL DIGEST phase of FIG. 7, after the assets re-calculate the final digest value which was announced by the forged proxy and compare the digest value to what they calculated based on their own knowledge of genuine proxy properties, the genuine assets will detect a not-match, report the proxy as not being legitimate, and remove themselves from the authentication session.

If a forged proxy were to somehow sneak-in to a group of assets authenticating during the very first one-time initial deployment protocol, the forged proxy would fail this too, because the proxy must have a fresh AES encryption key installed to decrypt the properties of other assets and get to know their UID, INFO and PS. The AES key is pre-installed only on legitimate assets before they go through the initial deployment protocol.

Replay Attack (in the Next After-Deployment Session)

In this attack, the attacker tries to replay the authentication session values (eavesdropped in earlier session) of a specific asset in the next session trying to make the proxy and other assets think that the attacker is one of the legitimate assets in order to be authenticated.

Since the attacker did not go through the initial protocol deployment session, shown in FIG. 3, it has no initial knowledge about the real properties (UID, INFO, PS) of Asset A (as well as the Proxy and the other assets in the group) and, as a result, cannot resolve the other asset properties based on received hashed data values only. Consequently, the attacker will not be able to re-calculate the correct commitment values of the proxy and other assets to prove a match, when the proxy checks for this match. Furthermore, the INFO property of all assets includes also a time-period-stamp. So, at different (time+x seconds period) the INFO property value will be different and, as a result, the calculated commitment values and final digest values will be different for all other sessions. Due to this feature replay attacks in future authentication sessions can be effectively prevented.

Suppose, at the CHECKING COMMITMENT VALUE phase of the protocol, in FIG. 6, where the genuine asset must submit its calculated commitment value, the attacker instead of calculating a fresh commitment simply submits an earlier (in previous session) eavesdropped commitment value of attacked genuine asset (e.g. Asset B). The eavesdropped Asset B's commitment value will appear to be different from Asset B's current commitment value which is recalculated by the proxy based on its initial knowledge about real properties (UID, INFO, PS) of Asset B and the current time-period-stamp value. As a result, Asset-B-Eve will be denied and reported by the proxy.

Replay Attack (within Current After-Deployment Session)

In this attack, the attacker tries to replay the authentication session values of targeted asset in a current session to make the proxy and other assets think that the attacker is a legitimate asset in order to be authenticated.

Since the attacker did not go through the initial protocol deployment session of FIG. 3, it has no initial knowledge about real properties (UID, INFO, PS) of Asset A (as well as the Proxy and the other assets in the group) and, as a result, cannot resolve the other asset properties based on received hashed data values. Consequently, the attacker will not be able to calculate correctly its "own" commitment value or re-calculate correct current commitment values for the proxy and other assets to prove a match when the proxy checks for this match.

Every new randomized hash value and nonce being transmitted during the after-deployment handshaking phase (FIGS. 4a & 4b) becomes invalid immediately (from asset-recipient's standpoint) after they have been received by an asset-recipient. An attacker needs at least a one-time data transmission event to eavesdrop the data. If the attacker wants to transmit eavesdropped data in the same session, these same data will be rejected by recipients, since the recipients have already received the one-time values from the genuine asset B which they then receive from the eavesdropping Asset B. In this situation the attacker will be denied and reported.

Injection Attack

This attack can be introduced after passing the replay attack. In this attack, the attacker attempts to inject false data into the group of authenticated assets. It must be authenticated to do so.

Since the above-described protocol embodiment prevents replay attacks, the injection attack is also preventable.

Session Hijacking Attack

In this attack, the attacker attempts to take control of the authentication session by substituting the proxy or sneaking-in in the middle of the session as a proxy.

Since the protocol prevents the possibility of authentication using a forged proxy (see above) and at the end of every session there is final CHECKING MILESTONES phase (FIG. 8) which eliminates the possibility for any asset(s) being authenticated if the asset did not go through all the required milestones of the authentication protocol, it is therefore not possible for an attacker to successfully complete an authentication session by hijacking the session.

Brute Force

A brute force attack is a trial-and-error method used to obtain data values exchanged by assets during an authentication session. In a brute force attack, automated software is used to generate a large number of consecutive guesses as to the value of the desired data.

In this protocol embodiment, asset properties are hashed using the randomized one-way SHA-3 hash function and reverse-engineering of this property data from the hash values is impossible with extremely high probability. Furthermore, the session duration is very short (usually less than 0.01 sec, depending on the quantity of the authenticating assets); the SHA-3 hashed asset commitment values are different for every participating asset in the session and the SHA-3 hashed final digest values are different in every new authentication session. Therefore, guessing the correct combination of all exchanged authentication values during such a very short session is practically impossible and infeasible, thus minimising the risk of a brute force attack.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method for authenticating a first device to a second device using a proxy device, wherein:
the first device stores first-device data and a first-device private key;
the second device stores second-device data and a second-device private key;
the proxy device stores proxy data and a proxy-device private key;
the first-device data is additionally stored by the second device and by the proxy device; and
the second-device data is additionally stored by the first device and by the proxy device,
the proxy data is additionally stored by the first device and by the second device;

the method comprising, in a commitment phase:
the first device using the first-device data and first-device secret-key information to generate a one-time first-device commitment value, the first-device secret-key information comprising, or being derived from, the first-device private key and a first random nonce;
the first device sending the one-time first-device commitment value to the proxy device;
the second device using the second-device data and second-device secret-key information to generate a one-time second-device commitment value, the second-device secret-key information comprising, or being derived from, the second-device private key and a second random nonce; and
the second device sending the one-time second-device commitment value to the proxy device,
the proxy device using the proxy data and proxy-device secret-key information to generate a one-time proxy-device commitment value, the proxy-device secret-key information comprising, or being derived from, the proxy-device private key and a third random nonce;
the proxy device sending the one-time proxy device commitment value to the first device and to the second device;

the method further comprising, in a checking phase performed after the commitment phase:
the first device communicating the first-device secret-key information to the proxy device;
the first device communicating the first-device secret-key information to the second device;
the second device communicating the second-device secret-key information to the proxy device;
the proxy device communicating the proxy-device secret-key information to the first device;
the proxy device communicating the proxy-device secret-key information to the second device;
the proxy device using the first-device data stored by the proxy device, and the first-device secret-key information received from the first device, to verify the one-time first-device commitment value received from the first device; and
the proxy device using the second-device data stored by the proxy device, and the second-device secret-key information received from the second device, to verify the one-time second-device commitment value received from the second device;
the first device using the proxy data stored in the first device and the proxy-device secret-key information received from the proxy device to verify the one-time proxy-device commitment value received from the proxy device;
the second device using the proxy data stored in the second device and the proxy-device secret-key information received from the proxy device to verify the one-time proxy-device commitment value received from the proxy device;

the method further comprising, in a digest phase, performed after a successful verification of the one-time first-device commitment value and of the one-time second-device commitment value in the commitment phase:
the proxy device calculating a one-time digest from i) the first-device data stored by the proxy device, ii) the second-device data stored by the proxy device, iii) the first-device secret-key information received from the first device, and iv) the second-device secret-key information received from the second device;
the proxy device sending the one-time digest to the second device;

the second device authenticating the first device by using at least i) the first-device data stored by the second device, ii) the second-device data stored by the second device, iii) the first-device secret-key information received from the first device, and iv) the second-device secret-key information, to verify the one-time digest received from the proxy device;

the proxy device sending the one-time digest to the first device;

the second device communicating the second-device secret-key information to the first device; and the first device authenticating the second device by using at least i) the first-device data stored by the first device, ii) the second-device data stored by the first device, iii) the first-device secret-key information, and iv) the second-device secret-key information received from the second device, to verify the one-time digest received from the proxy device.

2. The method of claim 1, wherein the first device verifies the one-time second-device commitment value, in addition to the verification of the one-time first-device and second-device commitment values performed by the proxy device.

3. The method of claim 1, wherein the second device verifies the one-time first-device commitment value, in addition to the verification of the one-time first-device and second-device commitment values performed by the proxy device.

4. The method of claim 1, wherein the proxy device calculating the one-time digest further comprises the proxy device additionally using the proxy data and the proxy-device secret-key information to calculate the one-time digest; and wherein the second device verifying the one-time proxy-device commitment value further comprises the second device additionally using the proxy data stored by the second device, and the proxy-device secret-key information received from the proxy device, to verify the one-time digest received from the proxy device.

5. The method of claim 1, wherein the proxy device calculating the one-time digest further comprises the proxy device additionally using the proxy data and the proxy-device secret-key information to calculate the one-time digest; and wherein the first device verifying the one-time proxy-device commitment value further comprises the first device additionally using the proxy data stored by the first device, and the proxy-device secret-key information received from the proxy device, to verify the one-time digest received from the proxy device.

6. A communication system comprising:
a first device;
a second device; and
a proxy device,
wherein:
the first device stores first-device data and a first-device private key;
the second device stores second-device data and a second-device private key;
the proxy device stores proxy data and a proxy-device private key;
the first-device data is additionally stored by the second device and by the proxy device;
the second-device data is additionally stored by the first device and by the proxy device; and
the proxy data is additionally stored by the first device and by the second device;

wherein the first device is configured, in a commitment phase, to:
use the first-device data and first-device secret-key information to generate a one-time first-device commitment value, the first-device secret-key information comprising, or being derived from, the first-device private key and a first random nonce; and
send the one-time first-device commitment value to the proxy device, wherein the second device is configured, in the commitment phase, to:
use the second-device data and second-device secret-key information to generate a one-time second-device commitment value, the second-device secret-key information comprising, or being derived from, the second-device private key and a second random nonce; and
send the one-time second-device commitment value to the proxy device, wherein the proxy device is configured, in the commitment phase, to:
use the proxy data and proxy-device secret-key information to generate a one-time proxy-device commitment value, the proxy-device secret-key information comprising, or being derived from, the proxy-device private key and a third random nonce; and
send the one-time proxy device commitment value to the first device and to the second device;

wherein:
the first device is configured, in a checking phase, performed after the commitment phase, to communicate the first-device secret-key information to the proxy device and to the second device;
the second device is configured, in the checking phase, to communicate the second-device secret-key information to the proxy device;
the proxy device is configured, in the checking phase, to use the first-device data stored by the proxy device, and the first-device secret-key information received from the first device, to verify the one-time first-device commitment value received from the first device; and
the proxy device is further configured, in the checking phase, to use the second-device data stored by the proxy device, and the second-device secret-key information received from the second device, to verify the one-time second-device commitment value received from the second device and to communicate the proxy-device secret-key information to the first device and to the second device;
the first device is further configured to use the proxy data stored in the first device, and the proxy-device secret-key information received from the proxy device, to verify the one-time proxy-device commitment value received from the proxy device;
and
the second device is further configured to use the proxy data stored in the second device, and the proxy-device secret-key information received from the proxy device, to verify the one-time proxy-device commitment value received from the proxy device;

and wherein:
the proxy device is configured to enter a digest phase in response to a successful verification of the one-time first-device commitment value and of the one-time second-device commitment value in the commitment phase;
the proxy device is configured, when in the digest phase, to calculate a one-time digest from i) the first-device data stored by the proxy device, ii) the second-device data stored by the proxy device, iii) the first-device secret-key information received from the first device, and iv) the second-device secret-key information received from the second device, and to send the one-time digest to the second device;

the second device is configured to authenticate the first device by using at least i) the first-device data stored by the second device, ii) the second-device data stored by the second device, iii) the first-device secret-key information received from the first device, and iv) the second-device secret-key information, to verify the one-time digest received from the proxy device; and wherein the proxy device is further configured to send the one-time digest to the first device, wherein the second device is further configured to communicate the second-device secret-key information to the first device and the first device is configured to authenticate the second device by using at least i) the first-device data stored by the first device, ii) the second-device data stored by the first device, iii) the first-device secret-key information, and iv) the second-device secret-key information received from the second device, to verify the one-time digest received from the proxy device.

7. The communication system of claim 6, wherein at least one of the first device, the second device, and the proxy device is a sensor or a sensor hub.

8. The communication system of claim 6, wherein:
the proxy device is configured, when calculating the one-time digest value, to additionally use the proxy data and the proxy-device secret-key information; and
the second device is configured, when verifying the one-time digest received from the proxy device, to additionally use the proxy data stored by the second device, and the proxy-device secret-key information received from the proxy device.

9. The communication system of claim 6, wherein:
the proxy device is configured, when calculating the one-time digest value, to additionally use the proxy data and the proxy-device secret-key information; and
the first device is configured, when verifying the one-time digest received from the proxy device, to additionally use the proxy data stored by the first device, and the proxy-device secret-key information received from the proxy device.

10. The communication system of claim 6, wherein the first-device data comprises first identification data that identifies the first device, and the second-device data comprises second identification data that identifies the second device.

11. The communication system of claim 6, wherein the first device, second device, and proxy device comprise radios and are configured to communicate by radio.

12. The communication system of claim 6, wherein the first device, second device, and proxy device are configured to communicate over one or more wired links.

* * * * *